United States Patent [19]

Harrington

[11] 4,113,467

[45] Sep. 12, 1978

[54] PROCESS FOR RECOVERING GOLD

[76] Inventor: Douglas S. Harrington, 1276 Fairfax St., Denver, Colo. 80220

[21] Appl. No.: 770,466

[22] Filed: Feb. 22, 1977

[51] Int. Cl.² ............................................. C22B 11/04
[52] U.S. Cl. .................................... 75/0.5 A; 75/108; 75/118 R
[58] Field of Search ......... 75/.5 A, 118, 108, 101 BE; 423/25

[56] References Cited

U.S. PATENT DOCUMENTS

| | | | |
|---|---|---|---|
| 1,833,276 | 11/1931 | Busch | 423/25 |
| 2,254,976 | 9/1941 | Powell | 75/108 |
| 3,271,135 | 9/1966 | Davidoff | 75/118 R |
| 3,717,453 | 2/1973 | Daiga | 75/118 R |
| 3,885,955 | 5/1975 | Lutz et al. | 75/118 R |

*Primary Examiner*—M. J. Andrews
*Attorney, Agent, or Firm*—Sheridan, Ross, Fields & McIntosh

[57] ABSTRACT

A method is disclosed for recovering gold from solution by means of adsorbing the solution onto a silica-containing catalyst to form a gel, reducing the gold with oxalic acid, removing the precipitated gold by washing, and recycling the catalyst and any unused reducing agent immediately to the adsorption step. The size of the gold particle produced is directly proportional to the grade of the catalyst used; recovery is greater than 99% effective.

17 Claims, No Drawings

PROCESS FOR RECOVERING GOLD

BACKGROUND OF THE INVENTION

1. Field of the Invention

The present invention relates to an improved process for recovering gold from solution, and would be classified in class 75.

2. Description of the Prior Art

Many processes over the years have been developed with the express purpose of recovering gold from solution (e.g., sea water, mining tailings). The effectiveness of these processes is not questioned; however, many of these systems are dangerous, polluting, energy consuming, and allow no control of the particle size produced. Many of these processes necessitate the use of filtration and elution-complex steps, which decrease the yield and render the processes economically impractical.

U.S. Pat. No. 3,925,114 to Takahashi et al., discloses precipitating crystalline oxalates of the metals aluminum, iron, cobalt and nickel from their chloride solution to produce a magnetic alloy powder. The oxalic acid used in the process of this patent apparently does not act as a reducing agent in view of the fact that the final reducing step is performed in the presence of hydrogen (col. 3, lines 31-36). However, the use of this process in the separation of gold from solution could necessitate the formation of gold oxalate, an unnecessary step in view of the process disclosed herein, even assuming the metals aluminum, iron, cobalt and nickel to be chemical equivalents of gold for the purposes of their recovery from solution.

U.S. Pat. No. 3,736,126 discloses the recovery of gold from solution using an adsorption bed which is a polymer of acrylic or methacrylic ester. However, the process of the present invention discloses a greatly simplified method using a different adsorption bed (sodium silicate) and oxalic acid as a reducing agent, which is completely oxidized into carbon dioxide and water.

U.S. Pat. No. 3,957,505 to Homick et al., discloses precipitating gold with a reducing solution. It is, of course, well known in the art to convert ionic gold to elemental gold by use of a reducing agent.

U.S. Pat. Nos. 3,834,896 and 3,935,006 disclose recovering gold which has been adsorbed from a processing solution on activated charcoal. However, sodium silicate gel is far superior to activated charcoal as an adsorption bed, as is shown below in the example, which discloses a gold recovery of up to 99.99%. Additionally, the teaching herein is far simpler and less expensive than the methods disclosed in the two patents. Further, oxalic acid or other reducing agents are not used in the processes of these patents.

A need is therefore present for a method for recovering gold from solution which avoids the use of toxic or expensive chemicals and mitigates waste disposal and pollution control problems. Further, a need is present for a method of recovering gold from solution which allows the use of a closed-circuit, high yield, short step process allowing control of the resultant particle size.

SUMMARY OF THE INVENTION

The present invention provides a practical and economical method for recovering gold from solution by adsorbing the solution onto powdered gypsum-bound sodium silicate, which serves as a catalyst for the reduction reaction of the ionic gold in solution. The grade of the elemental gold product which is obtained is directly proportional to the grade of sodium silicate gel used, thereby allowing control of the resulting elemental gold particle size. When the feed solution has been adsorbed onto the sodium silicate and a gel formed, this gel is treated with oxalic acid or other suitable reducing agent, whereupon an oxidation-reduction reaction occurs and reduced gold may be observed suspended in the gel. The oxalic acid is oxidized to form carbon dioxide gas and water. The system is then agitated to allow the metal to separate from the catalyst. The elemental gold, due to the consistency and electrostatic adherence of the hydrated catalyst, will remain suspended above the catalyst, and may now be easily washed from said catalyst. The catalyst may then be dried to remove the water formed in the oxidation-reduction reaction and recycled to the adsorption step without further treatment. Isolation of the system from ultraviolet radiation is preferable in order to prevent the formation of colloidal forms within the system, which will irretrievably suspend the elemental gold.

DESCRIPTION OF THE PREFERRED EMBODIMENT

As used herein in the specification and claims, the terms "silica compound," "silica gel," "sodium silicate," and "catalyst" are used to describe sodium silicate gel, preferably with gypsum as a binder; silicic acid, n-hydrate silic acid; granular silica, or other suitable silica-containing compounds which act as a catalytic promoter of the oxidation-reduction reaction performed later in the process. When hydrated, this sodium silicate does not form a complete gel, but the particles act like a gel and swell somewhat. The sodium silicate gel may be made by combining equal amounts of sodium silicate solution and acetic acid. The sodium silicate solution should have a minimum density of 1.06 $g/m^3$ and the acetic acid should not be greater than 1N to prevent the decomposition of the sodium silicate. This hydrated gel is then dried and ground.

The invention is related to the recovery of gold and silver from solutions which may be either aqueous or organic (e.g., alcohol-ether), from solids which may be solubilized, from compounds or mixtures, and generally from solutions containing mixtures of gold or silver with other compounds such as iron, copper, and lead. Furthermore, the size of the reduced elemental gold product may be controlled by the choice of the grade of the catalyst, the relationship being directly proportional.

It has been found that the silica-containing compound acts as a heterocatalyst for certain reducing agents to reduce the ionic gold to elemental gold. These same reducing agents are ineffective without the presence of the catalyst so that the catalytic combination is critical. It is a distinct advantage of the invention that certain organic compounds which normally do not reduce the metallic gold from solution will do so when the solution is adsorbed on the silica-containing catalyst. For example, it was found that such non-silica containing catalysts as Dowex 1-X (20-50) $Cl^-$, aluminum hydroxide, or Sephadex will not catalyze the reducing agent to reduce the gold.

The feed solution (e.g., sea water, waste water from mining operations) comprises either inorganic or organic solvent, and is adsorbed in the preferred embodiment onto the dry sodium silicate or other such suitable catalyst by allowing the solution to soak into a dry bed of the appropriate grade sodium silicate in the form of silica gel. Use of the silica gel in a dried or powdered form is not absolutely necessary; however, this will greatly enhance the recovery of gold and efficiency of the process. The chemical action of this catalyst is not presently known; however, it is theorized that the catalyst acts as a concentrating surface in accordance with heterocatalytic properties.

After the adsorption has occurred, excess solution may be removed and a solution of oxalic acid, which acts as a reducing agent, added to the mixture. The reduction reaction is allowed to run to completion, and the mixture may be heated to expedite the reaction, although this is usually unnecessary as the reaction is very rapid. It is often desirable to shield the reaction from ultraviolet wavelengths as colloidal forms result in some instances, unless colloidal forms are desired. Additionally, it may be desired to filter out solids from the solution before adsorption in order to prevent undue residue from building up in the catalyst bed.

After the reduction has occurred, as is evidenced by the visible presence of diffuse particles of gold throughout the bed and by a color change to purplish-brown, the gold may be separated from the catalyst by agitation or by any other suitable means of disturbing the bed. Any suitable means may be used to remove the reduced elemental gold, which is easily washed away from the silica gel, as the catalyst adheres and settles faster than the metal. The washed solution containing the metal particles may be allowed to settle and the decanted solution filtered through a filter press or centrifuged, or generally processed by any other suitable means for recovery.

Other silicon-containing catalytic compounds than silica gel which may be used include sodium silicate, sodium silicate containing gypsum as a binder, silicic acid, n-hydrate, granular silica, sodium silicate gel made by combining equal parts of sodium silicate solution and acetic acid as disclosed above, silicon carbide, silicon chloride, and silicic acid. Other reducing agents than oxalic acid which are operative for the purpose of the invention are other organic acids, such as formic acid, cinnamic acid, citric acid, tartaric acid, succinic acid, and others. The polyhydroxy-substituted di- and tri-acids such as citric acid, oxalic acid, and tartaric acid are particularly effective as well as unsaturated aromatic acids such as cinnamic acid. Succinic acid is operative but not as good as the others. Additionally, other reducing agents which may be used are sulfur dioxide, hydroxylamine, hydrazine, sodium thiosulfate, sodium hypophosphite, and many others.

Any compound with a half-cell potential that is reducing with respect to silver and gold in the chemical environment of the system is operative and this includes many compounds that normally complex with solubilized gold and silver (in ionic form), will act as a reducing agent in the presence of the silicon-containing catalyst. For example, formic acid or formate and oxalic acid which complex with iron, cobalt, nickel or gold (ionic forms) in the absence of silicon catalyst (as listed) to form single, binary, or ternary oxalate (or formate), yet which in the presence of the catalyst reduce the metal out as exemplified by their action on gold (in ionic form) being reduced to elemental gold by the oxalic acid in the presence of the catalytic silica gel, may be used.

The purity of the recovered elemental gold is usually greater than 99.99% without repeating the process. The percent yield of the system is virtually 100% since the high initial concentration of the reductant drives the reaction to completion with the aid of the catalyst.

Once the elemental gold has been recovered, the catalyst bed needs no regeneration, but may be washed. It has been found the drying the bed before subsequent use greatly increases its efficiency and yield. It should be noted that after adsorption, it may be necessary to acidify the system in order to maintain its initial efficiency. Additionally, the possibility exists that over a period of time the catalyst bed may degenerate and need replacement.

The oxalic acid introduced as the reductant oxidizes into carbon dioxide gas and water, which are non-polluting and which, because carbon dioxide is gaseous and therefore leaves the system, provides the driving force for virtual 100% efficiency of the reduction reaction. The system is also amenable to any commercial buffer system being used to reduce salt buildup and maintain a constant pH range.

The process of the invention may be performed in any suitable container since, unlike prior systems, the use of toxic and/or corrosive materials is avoided. Suitable containers include steel, polyethylene, polypropylene, polyvinyl chloride, and glass, although this listing is by no means intended to be all-inclusive. Furthermore, the gold or silver may be in the presence of other chemicals in the adsorbed solution (e.g., iron, zinc, copper, lead, etc.) and be reduced from this mixture by the process of this invention.

The invention is further illustrated by the following examples, which should not be construed as limiting thereof.

EXAMPLES

A solution of 5% gold was prepared by dissolving gold chloride ($HauCl_4 \cdot 3H_2O$) in a suitable amount of water. Dry sodium silicate gel powder was added in an amount of solution sufficient to hydrate all of the dry gel. The excess solution was poured off so that the level for the solution equalled the height of the gel. Saturated oxalic acid solution was added in an amount equal to approximately one-half the volume of the gel and the test tube covered with film to prevent evaporation. Upon completion of the reduction reaction, the suspension turned purplish-brown in color, and the solution was swirled and decanted. The decanted solution was then filtered to remove the elemental gold dust. Purity of the recovered elemental gold was 99.99%; 100% of the gold in the feed solution was recovered.

The gold solution may have any concentration of gold attainable and it may be a gold solution of water or alcohol. The amount of silicon-containing compound used is not critical but must be in an amount sufficient to act as a suitable catalyst for the reducing agent to reduce all of the gold present. Although the oxalic acid used was a saturated solution, a more dilute solution may be used so long as enough oxalic acid is used to reduce all of the gold present; however, a more dilute solution will take more time for the complete reduction to occur. Various mechanical means may be used to separate the gold from the solution or gel.

The following additional tests were made using the identical procedure as that used for Example 1:

| Ex. No. | Reductant | Metal | Catalyst |
|---|---|---|---|
| 2 | Cinnamic Acid | Gold | Gypsum-bound silicate (Na+) |
| 3 | Cinnamic Acid | Gold | Silicic acid |
| 4 | Tartaric Acid | Gold | Gypsum-bound silicate (Na+) |
| 5 | Tartaric Acid | Gold | Silicic acid |
| 6 | Citric Acid | Gold | Gypsum-bound silicate (Na+) |
| 7 | Citric Acid | Gold | Silicic acid |
| 8 | Oxalic Acid | Gold | Silicic acid |
| 9 | Oxalic Acid | Gold | Grade 7, Chromatographic silicate |
| 10 | Oxalic Acid | Silver | Gypsum-bound silicate |

Examples 2 through 9 gave good yields of gold, the best yields being obtained using oxalic acid as the reductant and gypsum bound (Na+) silicate as the catalyst. A good yield of silver was obtained in Example 10.

It can be seen from the above that a new and useful method has been discovered for effectively removing gold or silver from solution which avoids the use of toxic or expensive chemicals, and mitigates waste disposal and pollution control problems. Further, the invention provides a closed-circuit, high yield, short step process allowing control of the resultant particle size.

What is claimed is:

1. A process for recovering precious metals selected from the group consisting of gold and silver from solution which comprises:
    (a) adsorbing the solution onto sodium silicate to form a gelid reaction component;
    (b) adding to the gelid reaction component a reducing agent for the precious metal to cause a reduction reaction catalyzed by the silicon-containing compound;
    (c) recovering elemental precious metal from the gel.

2. The process of claim 1 in which the grain size of the recovered precious metal is above 5 microns.

3. The process of claim 1 in which the precious-metal-containing solution is comprised of an organic solvent and the precious metal.

4. The process of claim 1 in which the precious-metal-containing solution is comprised of an inorganic solvent and the precious metal.

5. The process of claim 1 in which the precious metal is gold.

6. The process of claim 1 in which the precious metal is silver.

7. The process of claim 1 in which the reducing agent is selected from the group consisting of cinnamic acid, tartaric acid and oxalic acid.

8. The process of claim 7 in which the reducing agent is cinnamic acid.

9. The process of claim 7 in which the reducing agent is tartaric acid.

10. The process of claim 3 in which the reducing agent is oxalic acid.

11. The process of claim 1 in which the reducing agent is oxalic acid.

12. The process of claim 1 in which the silicon-containing compound is sodium silicate.

13. The process of claim 12 in which the sodium silicate is a dry powder containing gypsum as a binder.

14. The process of claim 1 in which the silicon-containing compound is n-hydrate silicic acid.

15. The process of claim 1 in which the silicon-containing compound is sodium silicate gel made by combining equal parts of sodium silicate solution and acetic acid.

16. The process of claim 1 performed continuously by drying the separated silicon-containing compound and recycling said compound to step (a).

17. A process for recovering gold from solution which comprises:
    (a) adsorbing the solution onto sodium silicate to form a gel;
    (b) adding oxalic acid to the gold-containing gel to reduce the gold supported by the said solid silica compound into elemental gold;
    (c) agitating the gel to separate the said silica compound from the gold in suspension;
    (d) decanting the system to separate the silica compound from the gold; and
    (d) filtering the gold in suspension to recover elemental gold.

* * * * *